J. F. HAWORTH.
WIRE OR CABLE END CONNECTOR.
APPLICATION FILED SEPT. 27, 1917.
1,380,800.
Patented June 7, 1921.
4 SHEETS—SHEET 1.
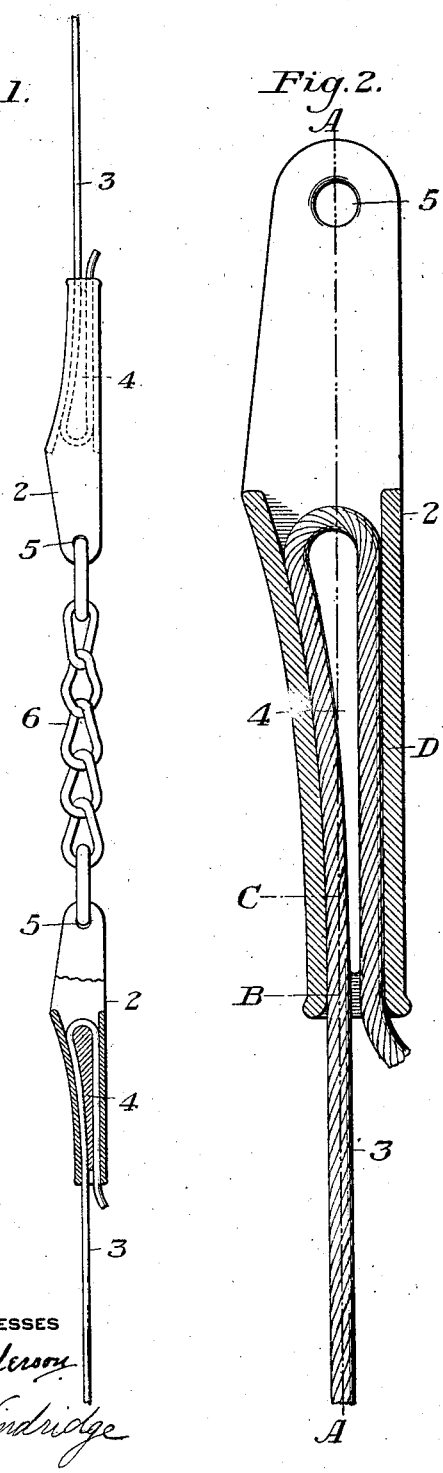
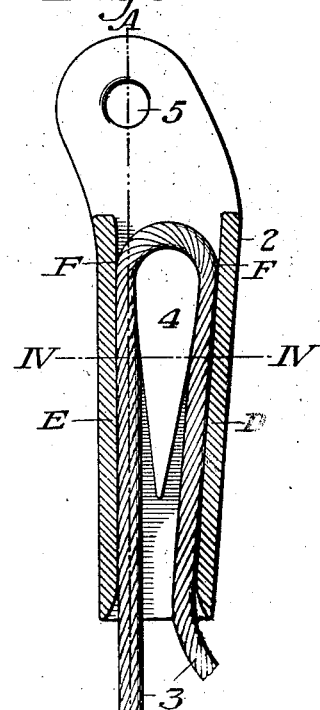
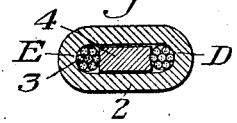
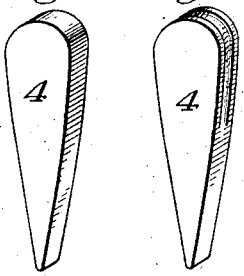
WITNESSES
INVENTOR

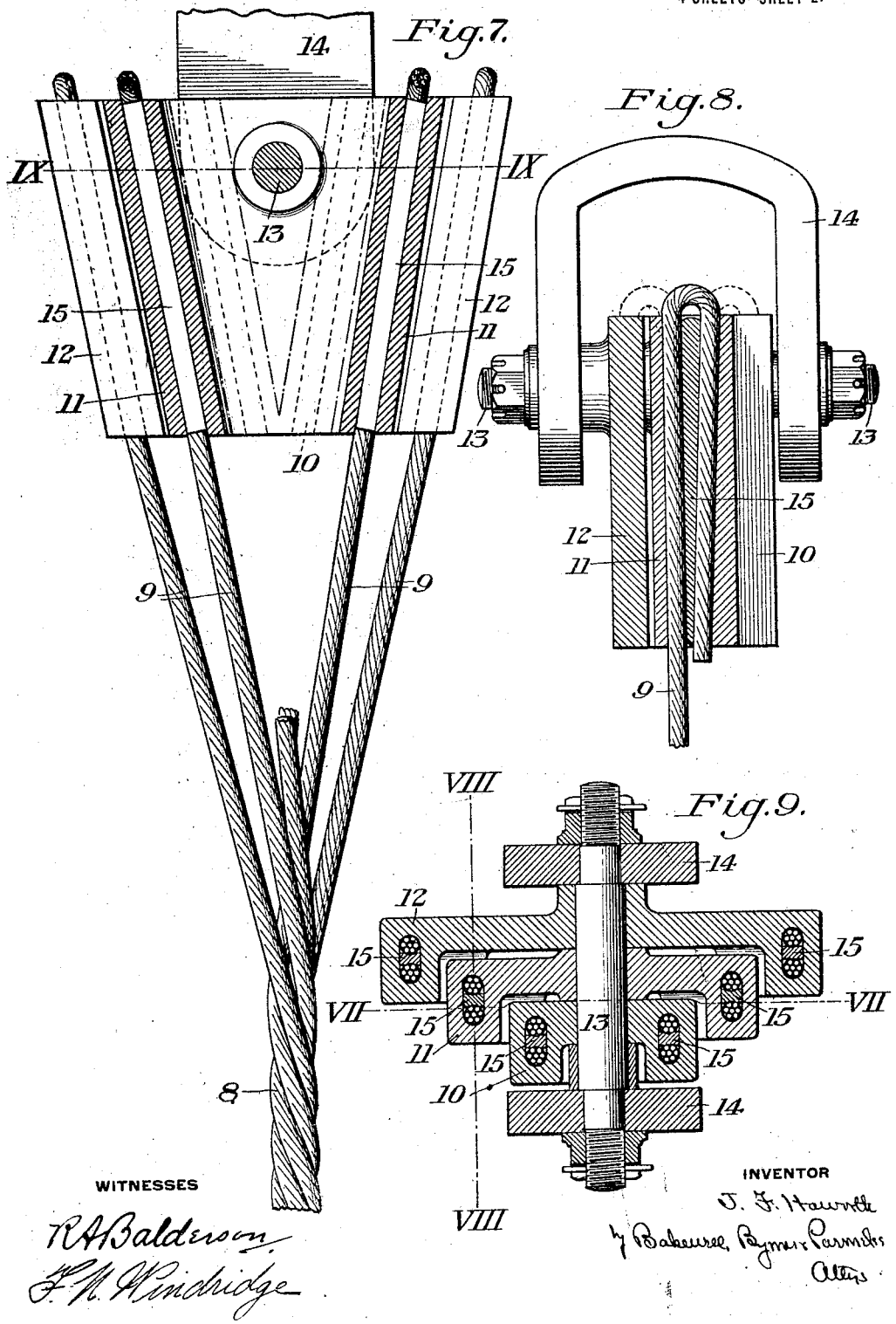

J. F. HAWORTH.
WIRE OR CABLE END CONNECTOR.
APPLICATION FILED SEPT. 27, 1917.
1,380,800.
Patented June 7, 1921.
4 SHEETS—SHEET 3.
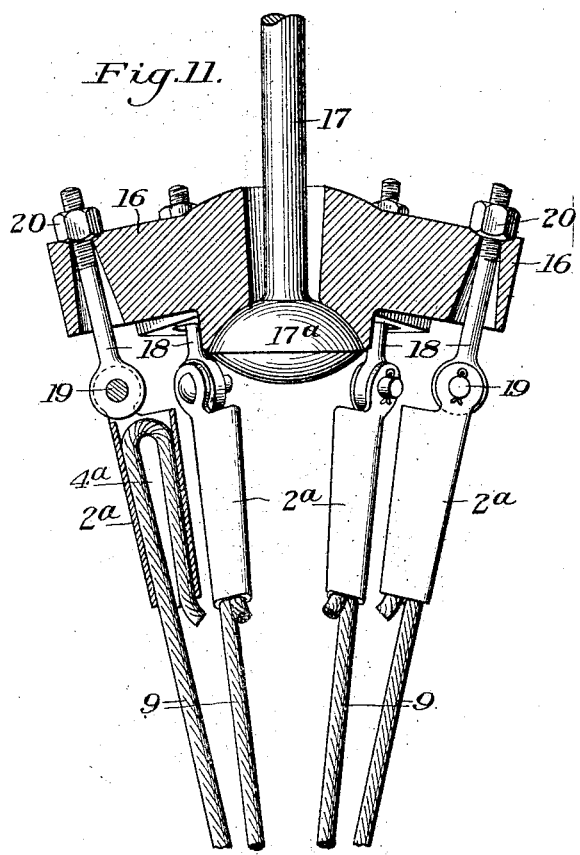
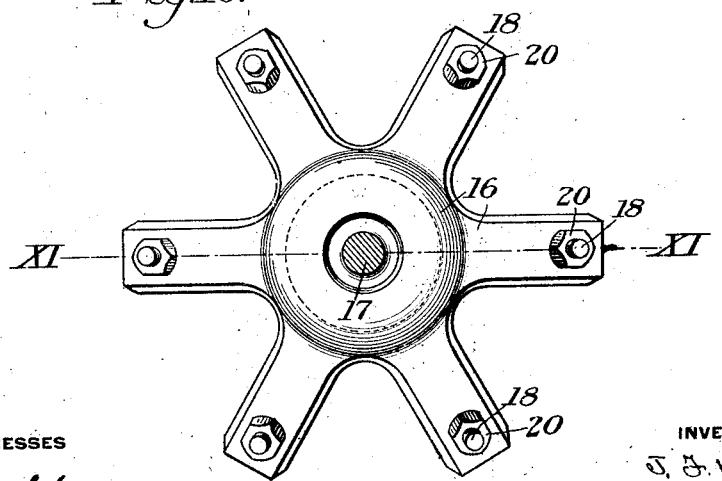
WITNESSES
INVENTOR J. F. HAWORTH.
WIRE OR CABLE END CONNECTOR.
APPLICATION FILED SEPT. 27, 1917.
1,380,800.
Patented June 7, 1921.
4 SHEETS—SHEET 4.
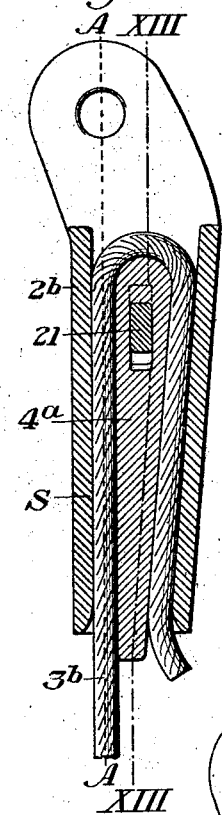
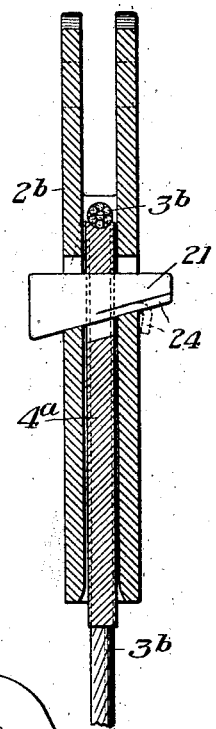
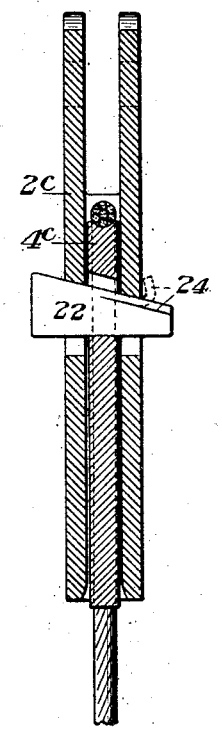
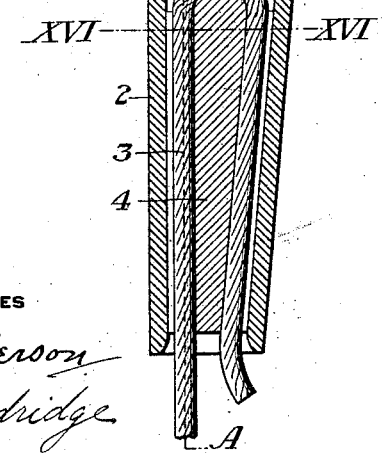
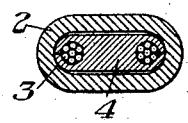
WITNESSES
INVENTOR

UNITED STATES PATENT OFFICE.

JEHU FREDERIC HAWORTH, OF EDGEWORTH, PENNSYLVANIA.

WIRE OR CABLE END CONNECTOR.

1,380,800.         Specification of Letters Patent.         Patented June 7, 1921.

Application filed September 27, 1917. Serial No. 193,504.

*To all whom it may concern:*

Be it known that I, JEHU FREDERIC HAWORTH, a citizen of the United States, residing at Edgeworth, Allegheny county, Pennsylvania, have invented a new and useful Improvement in Wire or Cable End Connectors, of which the following is a full, clear and exact description reference being had to the accompanying drawings, forming part of this specification, in which—

Figure 1 is a side elevation of a device for connecting the ends of two wires to each other.

Fig. 2 is a sectional view through one of the devices similar to that shown in Fig. 1 for connecting the end of a cable to a supporting member.

Fig. 3 is a view similar to that shown in Fig. 2, showing a modified form of connectors.

Fig. 4 is a sectional view on the line IV—IV of Fig. 3.

Figs. 5 and 6 are perspective views of two different forms of wedges.

Fig. 7 is a sectional view on the line VII—VII of Fig. 9 of a connector for connecting the ends of a series of strands of a cable.

Fig. 8 is a similar view on the line VIII—VIII of Fig. 9.

Fig. 9 is a sectional view on the line IX—IX of Fig. 7.

Fig. 10 is a plan view of a device for connecting the end of a cable built up of a series of strands.

Fig. 11 is a sectional view on the line XI—XI of Fig. 10.

Fig. 12 is a view similar to Fig. 2 showing another form.

Fig. 13 is a sectional view on the line XIII—XIII of Fig. 12.

Fig. 14 is a view similar to Fig. 13, of another modified form.

Fig. 15 is a sectional view of still another modified form.

Fig. 16 is a sectional view on the line XVI—XVI of Fig. 15, and

Fig. 17 is a sectional view of the wedge shown in Figs. 15 and 16 before the wire or cable has been secured thereto.

This invention has relation to an improvement in attaching devices or connectors for the ends of wires or cables (and by the term "cables," as used therein, I intend to cover either a single wire or a structure composed of a plurality of strands). My invention provides an attaching device or connector adapted for wide use in connection with cables which are under stress or wherever it is desired to connect one cable with another in a continuous length.

Heretofore, all devices of this character, of which I am aware, have been of such construction as to materially weaken the cable at the point of connection, so that the weakest point of the cable was at such point of connection. This has made it necessary to use a large amount of material in the construction of the cables beyond that which would otherwise be required in order to obtain the necessary strength and factor of safety at the connections.

My present invention provides an attaching device or connector of such construction and arrangement that the strength of the cable will not be materially impaired at the point of connection, but its full strength will be substantially retained, thus enabling cables to be made materially lighter throughout their entire length, with the consequent large saving in the cost of material, cost of manufacture, expense and labor in handling, erecting, etc.

Among the specific uses to which my invention is applicable may be mentioned guy and brace wires of various characters, elevator cables, tight wires, etc. My invention is also widely applicable wherever it is desired to make a quick and secure connection between the ends of two adjacent pieces of cable. My invention, in some of its forms, also provides a connector by means of which the several strands of larger cables may be individually secured and the tension thereon equalized.

The precise nature of my invention will be best understood by reference to the accompanying drawings which will now be described, it being premised, however, that various changes may be made in the details of construction and the arrangement of parts, without departing from the spirit and scope of my invention, since the latter is capable of various other applications.

Referring first to that form of my invention which is illustrated in Figs. 1 and 2, the form which is shown in Fig. 1 is substantially applicable for use where it is desired to make a connection between the end portions of two adjacent cables. In such cases I provide one of the attaching devices or connectors for each of the cable ends, and flexibly connect the two devices by an intermediate chain or link. Each of these connectors consists of a shell or casing 2, having therein an opening or seat adapted to receive the looped end portion of the cable 3. 4 designates a wedge or key member which consists of a loose piece capable of being inserted within the connector and within the loop of the wire or cable, after the latter has been inserted within a shell or casing, and which is adapted to securely clamp the cable within the shell or casing. The seating portion of the shell or casing is provided with an extension formed with an eye 5 which, in the form shown in Fig. 1, is adapted for engagement with one end of a flexible chain 6.

In accordance with my invention I so construct the shell or casing and the wedge and key members that at least a part of the clamped portion of the cable therein will be held in the direct line of the end pull of the cable and in such relation to the connector that a center line passing through the center of the eye 5 will pass substantially through the center of such clamped portion of the cable, as indicated by the dotted line A—A of Fig. 2. For this purpose I make that portion of one of the walls of the casing seat or opening, between the points B and C, substantially straight and parallel with such center line. Above the point C, this seating wall is preferably curved outwardly so that the cable is given a natural and gradual bend up to and around the convexed upper end of the wedge or key. The opposing edge of the wedge or key member 4 is preferably substantially parallel to the surface of the seating wall. The opposite edge of the wedge or key member and opposite seating wall D are substantially parallel, and at an angle to the center line A—A.

As will readily appear from Figs. 1 and 2, the construction is such that there is obtained not only a very effective clamping bite upon the looped end of the cable, but the lines of pull are such that all bending stresses are avoided on that portion of the cable within the connector adjacent to the free running portion thereof. Actual tests with connectors of this character have shown that the strength of the cable is substantially unimpaired in making the connection, the cable being substantially its full strength at this point.

In the modification, shown in Figs. 3, 4 and 5, the parts are of slightly different construction in that the key or wedge member is tapered at both edges, and the seating surface E of the casing or shell is substantially parallel to the center line A—A throughout its entire seating length. The opposite seating face D is at an oblique angle to the seating face E, the two seating faces converging in the direction of the length of the standing cable. In this construction the main bite on the cable occurs at the point F at the opposite end portion of the casing, the force of the bite gradually diminishing toward the point of the wedge. This construction also avoids bending strains on the cable. If there is any distortion of the cable, caused by the wedging action, this will occur at the point where the cable is under the least tension. As the curved portion of the wedge and casing above the point C in Figs. 1 and 2 is at an angle to the portions between C and B, the main bite of the cable will occur along the curved portion thereof and the maximum bite at the upper end of the curved portion when the parts are drawn to their seating positions. This will avoid the cutting or distorting of the cable at the end of the wedge, in a manner similar to that shown in Fig. 3.

The biting faces of the wedge may be either plain faces, as shown in Fig. 5, or they may be provided with grooves for the reception of the cable, as indicated in Fig. 6.

In the construction shown in Fig. 2, this feature of obtaining the maximum bite on the cable at the larger end of the wedge may be used while retaining the curved form of seating wall shown in said figure. In other words, the wedge of Fig. 2 may be made to have a greater diminishing grip toward its smaller end.

In some cases I find it advantageous to form the wedges of softer metal than the metal from which the cable is composed, so that the cable will to some extent embed itself in the wedge, thus eliminating the danger of flattening of the cable against the faces of the wedge, as well as increasing the effectiveness of the grip.

If desired, the wedges may also be constructed, as shown in Figs. 15, 16 and 17, in which they are shown as provided with deep grooves 4' to seat the cable. After the cable has been looped about the wedge, the walls of the grooves are bent around the cable, in the manner indicated in Fig. 16, thereby forming a protecting casing therefor. This protecting casing will effectively prevent any abrasion of the cable during such relative movements of the parts as may occur when the wedge and cable are seated under tension. This form of the invention is very desirable when used in connection with a cable formed of relatively soft metal.

In Figs. 7, 8 and 9 I have shown a form of my invention which is designed for use with larger cables, composed of a plurality of strands, each of which may be composed either of a single wire or of a plurality of wires or strands, and which are of a size that would make it impracticable to use a single attaching device or connector of forms previously described. In the device shown in these figures, the several strands 9 of the cable 8 at the end portion thereof are separated, and each of them is provided with an attaching device which may be of any of the forms previously described. These attaching devices are carried by the members 10, 11 and 12, each of which is pivotally seated on a bearing pin 13, secured in a yoke 14. Each of these members is provided with two seating portions for the reception of two of the strands 9, these seating portions converging toward the center line of the cable 8. 15 designates the wedges or key members, one of which is used for each strand and which coöperate with the corresponding seat to secure a looped end of the strand in the same manner as in the individual connectors before described.

In this manner each of the strands may be secured under substantially the same degree of tension; and by reason of the pivoted arrangement of the members 10, 11 and 12, any inequality of stress on the different strands will be readily compensated for by the movement of such members. The pin 13 has its center in the line of the standing portion 8 of the cable, and the several strands radiate symmetrically from this line into their respective connectors.

In Figs. 10 and 11 I have shown another form of the invention adapted for use with larger cables, in which form also the strands 9 are separated and each strand has its end portion looped within a seat of the casing member 2ª in which it is gripped by the wedge or key member 4ª, substantially as in any of the forms previously described. Each of the casing members 2ª is pivotally connected by a pin 19 with a tension bolt 18. These bolts extend within tapered openings in a head 16 and secured by means of nuts 20 having convexing bearing surfaces which coöperate with their seats to form a ball and socket connection for each bolt. The head 16, as shown, is supported by means of a rod 17 with which it has a ball and socket connection 17ª. In this form of my invention, as in the preceding forms, at least a portion of the gripped end of each strand is directly in line with the center of the pin 19 and with the direction of pull on the respective strands. In this form of my invention, the tension on the respective strands can be made substantially uniform by the adjustment of the nuts 20.

Figs. 12 and 13 show another form of my invention, which it may be desirable to use where the cable is placed under tension before the wedge is seated, as in attaching the guy wire. In such cases, a wire or cable is looped around the wedge, and the shell or casing member 2ᵇ is attached to its point of support. The wedge 4ª is then drawn to the seat within the casing member and is then moved back a slight distance by means of a tapered key 21. This shifting of the wedge 4ᵇ will permit the cable 3ᵇ to be drawn around the wedge by any suitable tensioning device connected to the free end of the cable. After the cable has been drawn tight, the key 21 is released to permit the wedge 4ª to be moved to its seat and secure the cable. Since this movement of the key toward its seat is comparatively slight, the cable is still maintained under the proper tension. In this form I have shown the biting edges of the wedge as substantially parallel to the adjacent seating walls of the casing, the seating wall S and the adjacent edge of the wedge being substantially parallel to the center line A—A, while the other edge of the wedge and the other seating wall of the casing are at an angle to such center line.

Fig. 14 shows a modification which is useful where it is desired to seat the wedge in the casing before the cable is placed under tension as in connecting a hoisting cable or similar device. In such cases, the loop of the cable and the wedge 4ᶜ are placed in the casing 2ᶜ and the wedge is then driven to its seat by means of a key 22. This prevents any possibility of movement of the cable and wedge with relation to the casing when tension is placed on the cable, as the cable and wedge are positively moved to their seats by the action of a key 22. In order to retain the keys 21 and 22 in position in the casing members, they may be provided with bendable portions 24 which can be bent, as shown in dotted lines, which will prevent any possibility of their being unseated.

The advantages of my invention result from the provision of an attaching device or connector which can be readily and conveniently used for a wide variety of purposes, which reserves to a maximum the initial strength of the cable and which, when applied to a multiple strand cable, provides means for equalizing the pull on the several strands while preserving substantially the full strength of each strand.

I claim:

1. A connector for a cable or wire when under stress, comprising a member having a substantially tapered seat for engaging at substantially diametrically opposite sides, the outer surfaces of reversely extending loop portions of a wire, and a movable wedge member coöperating therewith adapted to engage at substantially diametrically opposite portions the inner surfaces of said reversely extending loop portions of the wire, a portion of the sides of the smaller end of said wedge member having a greater taper than the taper of said seat to form a gradually increasing space between the sides of said wedge member and said seat for increasing the bite on one part of the engaged portion of the cable over the bite on another part of the engaged portion of the cable, substantially as described.

2. A connector for a cable or wire when under stress, comprising a member having attaching means formed thereon and having a substantially tapered seat for engaging at substantially opposite sides the outer surfaces of reversely extending loop portions of a wire, and a removable wedge member coöperating therewith and adapted to engage at substantially diametrically opposite portions the inner surfaces of said reversely extending loop portions of the wire, a portion of the sides of said wedge member which coöperates with said seat for clamping the cable having a different taper from the tapered seat in said first mentioned member to form a gradually increasing space between the sides of the wedge member and said seat for increasing the bite on one part of the engaged portion of the cable over the bite on another part of the engaged portion of the cable, a portion of the tapered seat on said first mentioned member extending in line with the attaching means thereon, substantially as described.

3. A connector for a cable or wire when under stress, comprising a member having a substantially tapered seat for engaging at substantially diametrically opposite sides the outer surfaces of reversely extending loop portions of a wire, and a movable wedge member coöperating therewith adapted to engage at substantially diametrically opposite portions the inner surfaces of said reversely extending loop portions of the wire, a portion of the sides of the smaller end of said wedge member having a greater taper than the taper of said seat to form a gradually increasing space between the sides of said wedge member and said seat for increasing the bite on one part of the engaged portion of the cable over the bite on another part of the engaged portion of the cable, and means for pivotally connecting said member for holding at least a part of the clamped portion of the wire within said member in the plane of the line of pull thereon, substantially as described.

4. A connector for a cable or wire when under stress, comprising a member having a substantially tapered seat for engaging at substantially diametrically opposite sides the outer surfaces of reversely extending loop portions of a wire or cable, and a wedge member movable relatively thereto having a peripheral recess in the walls thereof adapted to engage the inner surfaces of said reversely extending loop portions of the wire or cable, the angle of a portion of the engaging surfaces on the smaller end of the wedge member being greater than the taper of the seat in said first mentioned member for increasing the bite on the wire or cable at the point of least strain, substantially as described.

5. A connector of the class described, comprising a member having a substantially tapered seat for engaging substantially diametrically opposite portions of the outer surface of a reversely extending loop formed in the material being connected, a portion of said seat being tapered and a portion thereof being curved, and a removable wedge member adapted to engage the inner surface of said loop, a portion of the engaging surface of said wedge member being also curved to substantially conform to the curved portion of said seat, the angle of a portion of the engaging surface of the wedge being greater than the angle of the seat, so that the bite on one portion of the material in the loop between the wedge and the seat is greater than the bite on another portion thereof, substantially as described.

6. A connector for a cable or wire when under stress, comprising a member having a substantially tapered seat for engaging at substantially diametrically opposite sides the outer surfaces of reversely extending loop portions of a wire or cable and a wedge member movable relatively thereto and having a peripheral recess in the walls thereof, said wedge member having means coöperating with said recess for completely inclosing the portion of the cable passing therearound, substantially as described.

In testimony whereof, I have hereunto set my hand.

JEHU FREDERIC HAWORTH.